United States Patent [19]
Biancardi

[11] Patent Number: 5,878,588
[45] Date of Patent: Mar. 9, 1999

[54] ENERGY SAVING AIR COOLING SYSTEM

[76] Inventor: Robert P. Biancardi, 7009 W. 86th Pl., Crown Point, Ind. 46307

[21] Appl. No.: 996,651

[22] Filed: Dec. 23, 1997

Related U.S. Application Data

[63] Continuation-in-part of Ser. No. 693,361, Aug. 6, 1996, abandoned.

[51] Int. Cl.[6] .................................................... F25D 17/00
[52] U.S. Cl. ............................. 62/177; 62/260; 62/238.1; 62/DIG. 22; 62/272; 165/45
[58] Field of Search ................................ 62/238.6, 238.7, 62/260, DIG. 22, 272, 275, 177, 238.1; 165/177, 901, 45; 126/362

[56] References Cited

U.S. PATENT DOCUMENTS

| | | |
|---|---|---|
| 920,557 | 5/1909 | Fleming . |
| 1,944,992 | 1/1934 | Miller . |
| 1,945,441 | 1/1934 | Miller . |
| 2,030,032 | 2/1936 | Keyes . |
| 2,069,359 | 2/1937 | Dudley . |
| 2,085,964 | 7/1937 | Fonda . |
| 2,333,309 | 11/1943 | Gould . |
| 2,548,665 | 4/1951 | Grant . |
| 2,737,027 | 3/1956 | Kleist . |
| 2,872,858 | 2/1959 | Caldwell . |
| 3,102,399 | 9/1963 | Meckler . |
| 3,521,460 | 7/1970 | Knowles . |
| 4,241,588 | 12/1980 | Murphy et al. ......................... 165/901 |
| 4,294,083 | 10/1981 | King . |
| 4,375,831 | 3/1983 | Downing, Jr. . |
| 4,759,195 | 7/1988 | Biancardi . |

*Primary Examiner*—John M. Sollecito
*Attorney, Agent, or Firm*—Hill & Simpson

[57] ABSTRACT

A dehumidifier/cooling apparatus for use in a room having an elevated temperature and/or humidity is provided which utilizes the natural coolness of tap water to condense water vapor from the air or merely cool the air. The tap water line is diverted into a heat exchanger upstream of a hot water heater to dehumidify and/or cool the air in the room the air and remove the latent heat given off during condensation to cool and/or dehumidify the room air and to pre-heat the water entering the hot water heater.

23 Claims, 2 Drawing Sheets

ENERGY SAVING AIR COOLING SYSTEM

This application is a continuation-in-part of U.S. application Ser. No. 08/693,361, filed Aug. 6, 1996 now abandoned.

BACKGROUND OF THE INVENTION

The present invention relates to air cooling equipment, dehumidifiers and auxiliary water pre-heaters, and more particularly to a room air cooler/dehumidifier and water pre-heater to be used in conjunction with a tap water supply in a hot and humid environment, such as a commercial kitchen.

In commercial kitchens, such as those found in restaurants, hospitals dorms, etc., are uncomfortable year round due to excessive heat and moisture which occur from preparing the food. In order to cool or dehumidify the kitchen with a conventional air conditioner system this results in a large expense and excessive energy consumption. Many such systems cannot be operated in the winter in that they must be drained to avoid freezing of various fluids used in the system.

My prior U.S. Pat. No. 4,759,195, discloses a dehumidifier for use in an industrial or commercial building in conjunction with an air conditioning system which utilizes the natural coolness of tap water to condense water vapor from the air upstream of the evaporator coils of an air conditioner.

That patent teaches to place a dehumidifying/pre-heating coil within the duct work comprising the air conditioning system. Such an arrangement generally would be useful only when the air conditioning system is operating, and will provide cooler/dryer air only in those areas serviced by the air conditioning system.

SUMMARY OF THE INVENTION

The present invention utilizes a presently untapped, yet readily available and virtually free energy source to do the work of dehumidifying and cooling the air in a hot and/or humid room. This untapped energy source is the virtually constantly flowing water supply line to an industrial or commercial building which has the capacity to absorb a large amount of heat from the room air, perhaps sufficient to reduce the temperature below the dew point and to thereby condense the moisture from the air. In any event, the room air will be cooled and the tap water will be preheated. The pre-heated water can then be directed to the standard hot water heater for further heating. Because this water is pre-heated, the cost of operating the hot water heater will be reduced. It is preferred to direct only that water leading to the hot water heater through the dehumidifying/cooling apparatus, thereby to maximize the heat gain to the water to be heated. This will also avoid heating other water where heating is not desired.

Since large commercial kitchens have a relatively constant usage of tap water, the water in the incoming water line will be constantly moving, thus providing a continuous source of relatively cold water to act as a refrigerant to provide the dehumidification and cooling. The continuously moving water will absorb the heat given off by the water vapor as it condenses thus preventing the air leaving the dehumidifier/cooling coil from being at an elevated temperature. The tap water flowing through the dehumidifier/cooling coil will simultaneously be pre-heated for use in the hot water line leading to the hot water heater.

It is contemplated by the present invention that the incoming water line can be selectively diverted through a finned tube heat exchanger which is placed in the room to be cooled and dehumidified. A fan draws room air over the finned tube heat exchanger. The tap water may also be selectively caused to bypass the heat exchanger coil if the humidity of the air is low or if the temperature of the air in the room is already at a comfortable level.

A drain is provided for directing the condensed water vapor to an appropriate discharge point and a meter can be utilized in the drain to measure the amount of water collected and thus the effectiveness of the tap water dehumidifying apparatus.

DETAILED DESCRIPTION OF THE PREFERRED EMBODIMENTS

Figure 1:
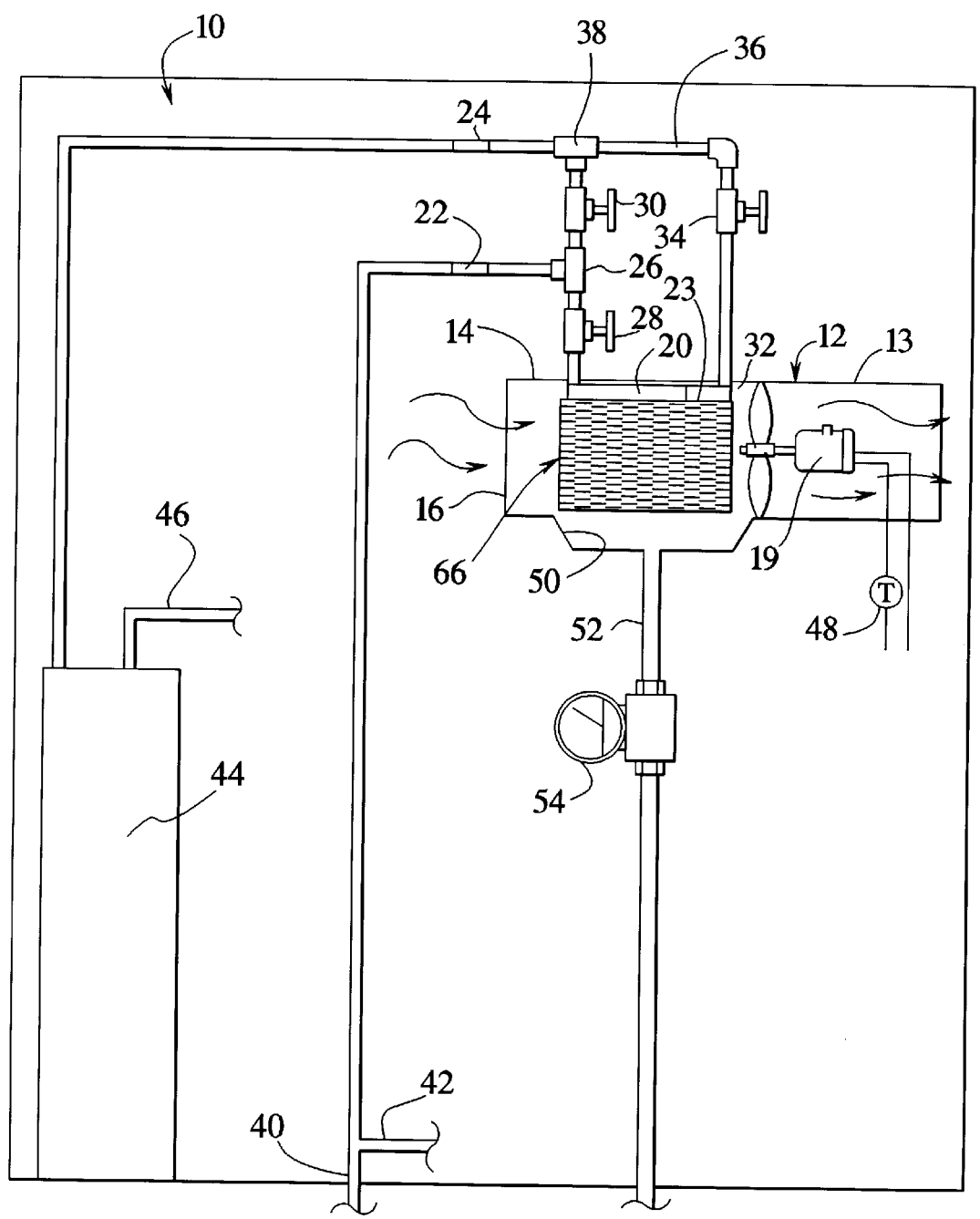
FIG. 1 is a schematic sectional view of a room including a dehumidifier/cooling apparatus incorporating the principles of the present invention.

In FIG. 1 there is illustrated a room generally at 10 which is oftentimes at a high temperature and/or high humidity, such as a commercial kitchen, fabric washing room or other room where heat or humidity are generated. Positioned within the room 10 is a dehumidifying/cooling apparatus 12 having an enclosure 13 with a short air intake conduit 14 which has an open end 16 exposed to the interior of the room.

Figure 2:
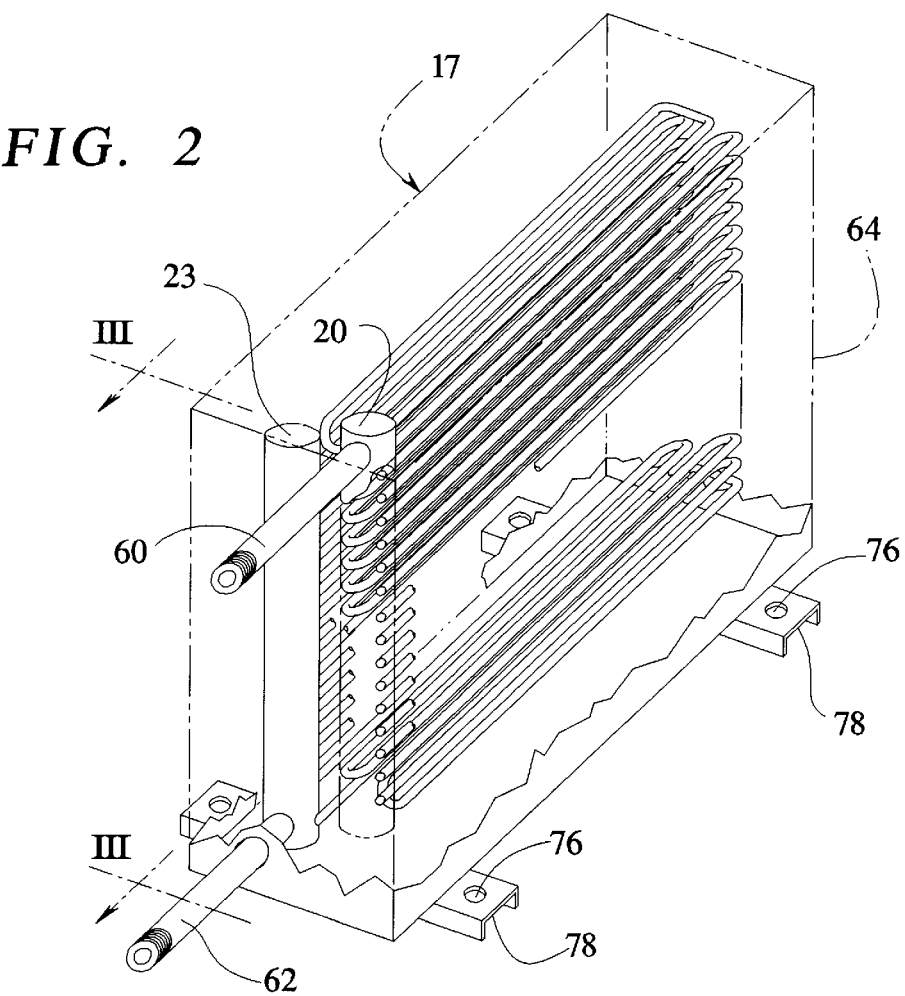
FIG. 2 is a partial cutaway sectional view of a heat exchanger of the dehumidifier/cooling apparatus illustrated schematically in FIG. 1.
Figure 3:
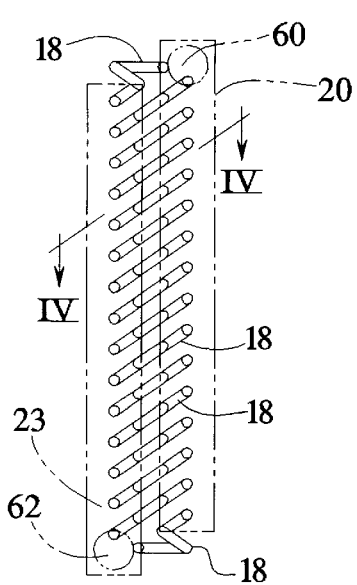
FIG. 3 illustrates an end view of the internal construction taken along line 3—3 of the heat exchanger of FIG. 2 showing the inlet, outlet and header tubes in phantom view.
Figure 4:
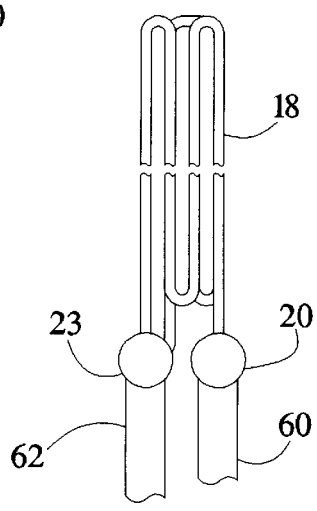
FIG. 4 is a sectional view illustrating one of the serpentine tube taken along line 4—4 of FIG. 3.

The dehumidifying/cooling apparatus 12 which incorporates the principles of the present invention, comprises a heat exchanger 17 illustrated in FIGS. 2–4 having an inlet connection 60 for connecting to an inlet pipe 22 as illustrated in FIG. 1 and an outlet connection 62 which communicates with a discharge pipe 24 also as illustrated in FIG. 1. The inlet connection 60 connects to a first header pipe 20 within the heat exchanger 17 and the second connection 62 communicates with a second header pipe 23 within the heat exchanger. The header pipes 20 and 23 are arranged adjacent and parallel to one another as best illustrated in FIG. 2. As illustrated in FIGS. 3 and 4, a series of serpentine tubes or coils 18 extend from the first header pipe 20 along the length of an enclosure 64 and passing over the length of the enclosure 64 a plurality of times as defined by the number of bends or curves in the coils 18. The opposite ends of the coils 18 connect with the second header pipe 23. Fluid passes from the first header pipe 20 through the coils 18 and into the header pipe 23 as is defined below. Room air is drawn by a fan 19 positioned within the overall enclosure 13 over the coils 18 and the header pipes 20 and 23. In one embodiment, the coils 18 may include as is known in the art a plurality of thin metal fins 66 for increasing the overall heat exchanger efficiency.

The inlet pipe 22 is connected by means of a T-junction 26 and the first connection 60 of the first header pipe 20. The second valve 30 is positioned between the T-junction 26 and the discharge piping 24. The second connection 62 of the header pipe 23 is connected to a third valve 34 which then connects by way of piping 36 to a T-junction 38, one leg of which is connected to the discharge piping 24 and the other leg of which is connected to the second valve 30.

The inlet 22 is connected to the water supply line 40 or water main through which tap water for the room is supplied. A bypass pipe 42 is preferably connected to the water supply line 40 upstream of the dehumidifying/cooling apparatus 12 to be connected to cold water outlets in the room 10 or elsewhere. The discharge pipe 24 is connected to the makeup water inlet (25) of thereby preheating the makeup water a hot water heater 44. An outlet pipe 46 from the hot water heater 44 is provided to supply the hot water outlets in the room or elsewhere.

When the dehumidifier/cooling apparatus 12 is in operation, valves 28 and 34 are open while valve 30 is closed. This causes all of the water flowing in through inlet piping 22 to flow through the first header pipe, the coils 18 and then out through the second header pipe to the discharge piping 24. When it is desired to take the coils 18 out of operation, valves 28 and 34 are closed while valve 30 is opened. This then causes the water to flow in through inlet piping 22 to bypass the coils 18 by flowing through valve 30 and then out through discharging piping 24. Intermediate flows of less than all of the inflowing tap water can be effected by partially opening both valve 28 and valve 34.

To avoid an unacceptable pressure drop in the tap water line feeding the hot water heater 44, the header pipes 20, 23 are oversized, preferably with an O.D. of about 2 inches. This 2 inch dimension assumes that the inlet piping 22 and discharge piping 24 and intermediate piping 36 are of a smaller diameter such as 1 ½ inches. This also assumes that the coils 18 are of a much smaller diameter such as ½ inch. As will be evident to those in the art, the header pipes may be of a size other than 2 inches as long as the inlet and discharge piping 22 and 24 and the coil tubes 18 are correspondingly sized according to the requirements of the particular dehumidifying/cooling system 12. Most heat exchangers are not concerned with pressure loss since the water (or other fluid) flowing therethrough is merely disposed of and not used. In this application, the pressure is of concern and must be maintained because hot water is being used downstream of the system. Also, since the water flowing through the heat exchanger is to available for human consumption, it is preferred that the heat exchanger be fabricated without the use of lead, such as in the soldering or brazing materials.

In order to effect a dehumidification of the air by flowing tap water through the coils 18, the water has to be below the dew point of the air. As an example, the tap water in the Chicago area during the summer of 1985 ranged from 51° F. to 71° F. with an average of 61° F. An average temperature of 61° F. would be below the dew point temperature of air 70° F. or above with a relative humidity of 42% or above. As the air temperature rises, the relative humidity percentage at a specific dew point temperature would drop. That is, at an ambient air temperature of 85° F. the dew point temperature of 61° F. corresponds to a relative humidity of approximately 22%. In an environment of a kitchen or similar room having sources of heat and humidity, these conditions are often met. Thus, the tap water would be effective to condense moisture out of the air as the air is circulated through the dehumidifying/cooling device 12. Further, even if dehumidifying does not occur, cooling will occur since the temperature of tap water is generally below the room temperature in a kitchen or similar environment.

A thermostat 48 may be used in the room, which is arranged to control operation of the fan 19. Thus, the valves 28 and 34 can be left in the open position all the time (since pressure loss is minimal) and the thermostat 48 will serve to selectively control the fan 19 as cooling in the room is needed.

Positioned below the coils 18 are a condensate collection trough 50 which serves to direct the condensed water vapor to a drain pipe 52. This trough 50 may be incorporated into the heat exchanger housing 64, the system enclosure 13, or both. A flow meter 54 can be placed in the drain pipe 52 to provide a visual indication of the amount of water vapor being extracted from the air as a means of determining the energy savings of the apparatus.

Thus, a substantially free or low energy cost arrangement, which only requires a relatively low energy cost fan is provided to absorb the latent heat of water vapor from the air and to thereby dehumidify the air and/or cool the air. This previously unused, but readily available source of energy can effect a substantial improvement in the comfort in the room at a very low energy cost. Further, a cost of operating the hot water heater will also be reduced.

It will be appreciated that automatic controls can be applied to the valves to selectively open or close the valves depending upon the temperature and humidity conditions of the air as well as the incoming water in order to automatically cause the water to flow through the dehumidifying apparatus when the water temperature is below the dew point temperature of the ambient air or when the ambient air is above a certain comfort level.

Figure 5:
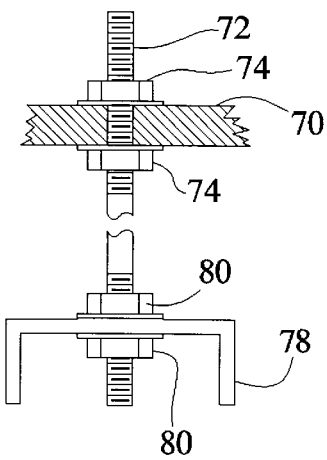
FIG. 5 is a view of one embodiment of an attachment construction for hanging the heat exchanger of FIG. 2 from a ceiling in a room.

FIG. 5 illustrates one means of attaching or mounting the heat exchanger 17 within a room or building. This means includes hanging the heat exchanger 17 from a ceiling or ceiling bracket 70 which is mounted to a ceiling. An elongate threaded rod 72 is secured to the bracket 70 by a pair of threaded fasteners 74 which permit positionally adjusting the threaded rod 72 relative to the bracket 70. The lower end of the threaded rod 72 is received through an opening 76 formed in channel brackets 78 received on a portion of the heat exchanger 17 as illustrated in FIG. 2. The threaded rod is again secured to the channel brackets 78 by a fastener 80 permitting positional adjustment of the threaded rod 72 relative to the brackets 78. As will be evident to those skilled in the art, the channel brackets 78 may be secured by many known means such as welding to the heat exchanger housing 64 in many orientations. FIG. 1 illustrates the heat exchanger 17 with the header pipes 20 and 23 disposed on the top surface. FIG. 2 illustrates the header pipes 20 and 23 disposed on a side surface. The channel brackets 78 may be disposed as illustrated on the bottom surface of the heat exchanger 17 or on any other surface of the heat exchanger as desired for a particular mounting orientation. The heat exchanger 17 may also be mounted outside of the room such as on the roof of the building for which the system is installed.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. An energy saving air cooler and water preheater disposed to receive air from a room within a building to cool air within said room independent of any other air heating or cooling apparatus serving said building and having a tap water conduit leading from a tap water supply line, which supplies tap water to points within the building, to a makeup water inlet of a hot water heater comprising:

an air moving device positioned in said building having an intake taking air from within said building, an outlet returning air into said building, and producing a recirculating stream of air therebetween from air within said building;

an air cooling apparatus positioned in said recirculating stream of air; said air cooling apparatus comprising a heat exchanger positioned in said recirculating stream of air and conduit means for diverting at least a portion of a relatively continuously moving stream of tap water from said tap water conduit through said heat exchanger and returning said diverted portion to said tap water stream to said water makeup inlet of said hot water heater;

said diverted tap water flowing by means of a pressure differential between said tap water supply line and said utilization points without utilization of a separate pump;

whereby, said recirculating stream of air consists solely of recirculating air within said room through said heat exchanger;

wherein heat carried in said recirculating stream of air is absorbed by said tap water flowing through said air cooling apparatus, thereby cooling said recirculating stream of air exiting said outlet into said room and preheating said tap water supplied to said water heater.

2. An energy saving air cooler according to claim 1, wherein at least a portion of said tap water is routed to said air cooling apparatus when below a dew point temperature of said recirculating stream of air, such that water vapor in said recirculating stream of air is condensed, thereby dehumidifying said recirculating stream of air.

3. An energy saving air cooler according to claim 1, wherein said heat exchanger comprises a plurality of tubes with fins attached thereto, wherein said tubes carry said tap water.

4. An energy saving air cooler according to claim 3, wherein said heat exchanger comprises header tubes for feeding a plurality of serpentine tubes attached to said fins, wherein said header tubes have an enlarged diameter to prevent a significant pressure loss of the tap water flowing through said heat exchanger.

5. An energy saving air cooler according to claim 4, wherein said header tubes have a diameter of about 2 inches.

6. An energy saving air cooler according to claim 3, wherein said tubes are joined with lead free brazing material to prevent lead from entering said tap water.

7. An energy saving air cooler according to claim 1, including a thermostat positioned within said building for controlling said air moving device.

8. An energy saving air conditioner system comprising:
a building having a source of tap water;
a hot water heater for said tap water;
conduit means for directing a stream of tap water to a makeup water inlet of said hot water heater through said hot water heater to utilization outlets within said building;
an air cooling and dehumidifying apparatus comprising a heat exchanger and conduit means positioned to receive air from said room and for diverting at least a portion of said stream of tap water, upstream of said hot water heater, through said heat exchanger and for returning said portion to said tap water stream upstream of said hot water heater makeup water inlet;
an air moving device positioned adjacent said air cooling and dehumidifying apparatus for circulating air from within said room, through said air cooling and dehumidifying apparatus and returning said air to said room, and producing a recirculating stream of air through said air cooling and dehumidifying apparatus consisting solely of recirculating air within said room through said heat exchanger;
said diverted tap water flowing by means of a pressure differential between said tap water supply line and said utilization points without utilization of a separate pump;
whereby, water vapor in said recirculating stream of air is condensed onto said heat exchanger when said tap water has a temperature below a dew point temperature of said recirculating stream of air, thereby dehumidifying and cooling said recirculating stream of air exiting said outlet into said room and heating said diverted tap water before said diverted tap water enters said hot water heater, thereby cooling air within said room independent of any other air heating or cooling apparatus serving said building.

9. An energy saving air conditioning system according to claim 8, wherein said heat exchanger comprises a plurality of tubes with fins attached thereto, wherein said tubes carry said tap water.

10. An energy saving air conditioning system according to claim 9, wherein said heat exchanger comprises header tubes for feeding a plurality of serpentine tubes attached to said fins, wherein said header tubes have an enlarged diameter to prevent a significant pressure loss of the tap water flowing through said heat exchanger.

11. An energy saving air conditioning system according to claim 10, wherein said header tubes have a diameter of 2 inches.

12. An energy saving air conditioning system according to claim 9, wherein said tubes are joined with lead free brazing material to prevent lead from entering said tap water.

13. An energy saving air conditioning system according to claim 9, including a thermostat for controlling said air moving device.

14. An energy saving air cooling system comprising:
a room in a building having a hot water heater, a source of tap water drawn from a water main serving the building, and a source of heat independent of a room temperature control system;
a conduit for directing a stream of tap water through said hot water heater to utilization outlets within said building;
an air cooling apparatus, positioned to receive air from said room, comprising a heat exchanger and conduit means for diverting at least a portion of said stream of tap water, upstream of said hot water heater, through said heat exchanger and for returning said portion to said tap water stream upstream of said hot water heater;
an air moving device positioned adjacent said air cooling apparatus for circulating air from within said room, through said air cooling apparatus and returning said air to said room, and producing a recirculating stream of air through said air cooling apparatus consisting solely of recirculating air within said room through said heat exchanger;
said diverted tap water flowing by means of a pressure differential between said tap water supply line and said utilization points without utilization of a separate pump;

whereby, said recirculating stream of air is cooled prior to exiting directly into said room through an outlet of said air cooling apparatus and said diverted tap water is heated before said hot water heater, thereby cooling air within said room independent of any other air heating or cooling apparatus serving said building.

15. An energy saving air conditioning system according to claim 14, wherein said room further includes a source of humidity independent of said room temperature control system and wherein at least a portion of said tap water is routed to said air cooling apparatus when below a dew point temperature of said recirculating stream of air, such that water vapor in said recirculating stream of air is condensed at said heat exchanger, thereby dehumidifying said recirculating stream of air.

16. An energy saving air conditioning system according to claim 14, wherein said room further includes a source of humidity and wherein said tap water in said air cooling apparatus is maintained below a dew point temperature of said stream of air, such that water vapor in said stream of air will be condensed at said heat exchanger, thereby dehumidifying said stream of air.

17. An energy saving air conditioning system according to claim 14, wherein said tubes are joined with lead free brazing material to prevent lead from entering said tap water.

18. An energy saving air cooler according to claim 14, including a thermostat for controlling said air moving device.

19. An energy saving air cooling system according to claim 14, wherein said heat exchanger of said air cooling apparatus has a plurality of tubes with fins attached thereto.

20. An energy saving air cooling system according to claim 14, wherein said heat exchanger of said air cooling apparatus has header tubes having an enlarged diameter to prevent a significant pressure loss of tap water flowing through said heat exchanger.

21. An energy saving air cooling system comprising:

a room in a building having a source of tap water and a heat generating object disposed within the room;

a hot water heater disposed within the room;

an air cooling apparatus disposed within the room comprising a heat exchanger having a plurality of coils and fins attached thereto, a first header pipe communicating via a pipe source of tap water and a second header pipe communicating via a pipe with said hot water heater wherein said coil tubes direct water from said first header pipe to said second header pipe, said heat exchanger, wherein said stream of tap water is diverted from said source of tap water through said heat exchanger and then to a makeup water inlet of said hot water heater;

an air moving device positioned within said room adjacent said air cooling apparatus circulating air from within said room, through said air cooling apparatus and returning said air to said room, and producing a recirculating stream of air through said air cooling apparatus consisting solely of recirculating air within said room through said heat exchanger;

said diverted tap water flowing by means of a pressure differential between said tap water supply line and said utilization points without utilization of a separate pump;

a plurality of mounting mechanisms supporting said heat exchanger to a surface within said room, each of said mounting mechanisms having an elongate threaded rod adjustably securing said heat exchanger to said surface;

wherein said first and second header tubes each have a diameter larger than a diameter of said plurality of coil tubes and larger than a diameter of said pipes carrying said stream of tap water to prevent a significant pressure loss of tap water flowing through said heat exchanger;

and wherein said recirculating stream of air is cooled prior to exiting directly into said room through an outlet of said air cooling apparatus and diverted tap water is heated before entering said hot water heater, thereby cooling air within said room independent of any other air heating or cooling apparatus serving said building.

22. The energy saving air cooling system according to claim 21, wherein said heat exchanger is mounted adjacent a ceiling in said room.

23. The energy saving air cooling system according to claim 22, wherein said heat exchanger is sized to allow for normal head room below said heat exchanger when said heat exchanger is mounted to said ceiling in said room.

* * * * *